Oct. 16, 1923.
W. H. DINSPEL ET AL
1,470,600
PNEUMATIC DISPATCH APPARATUS
Filed Aug. 12, 1920  3 Sheets-Sheet 3
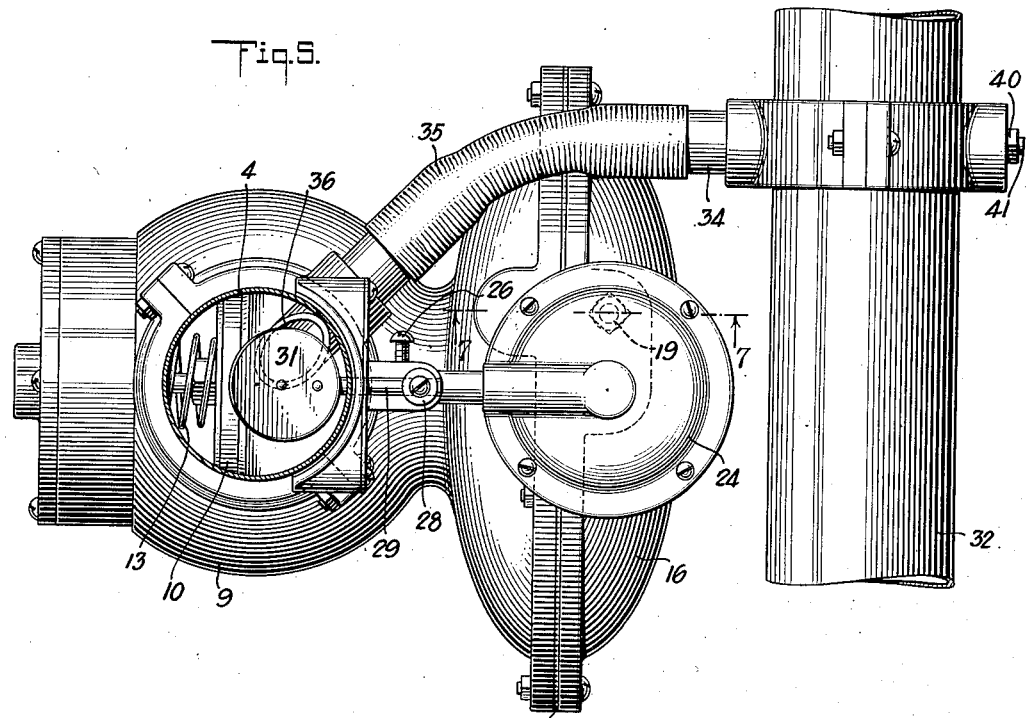
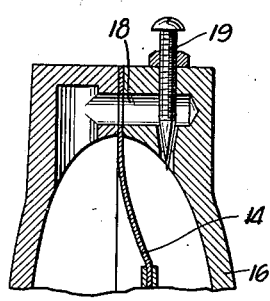
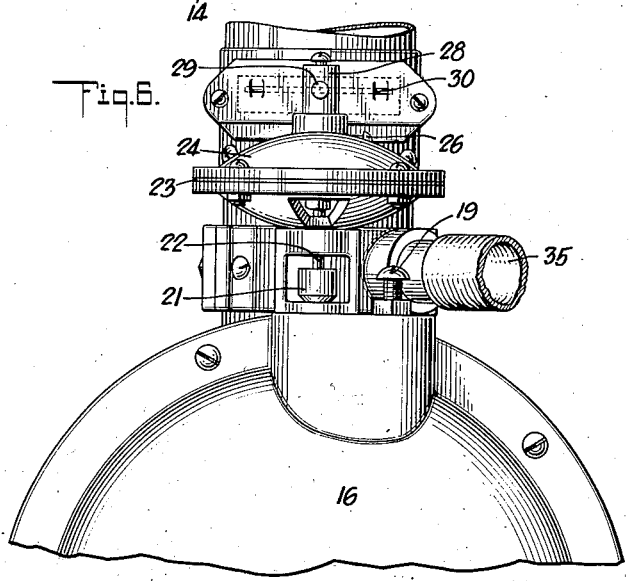
WITNESSES
INVENTORS
WILLIAM H. DINSPEL
AND EDMUND WEIGELE
BY
ATTORNEYS Patented Oct. 16, 1923.

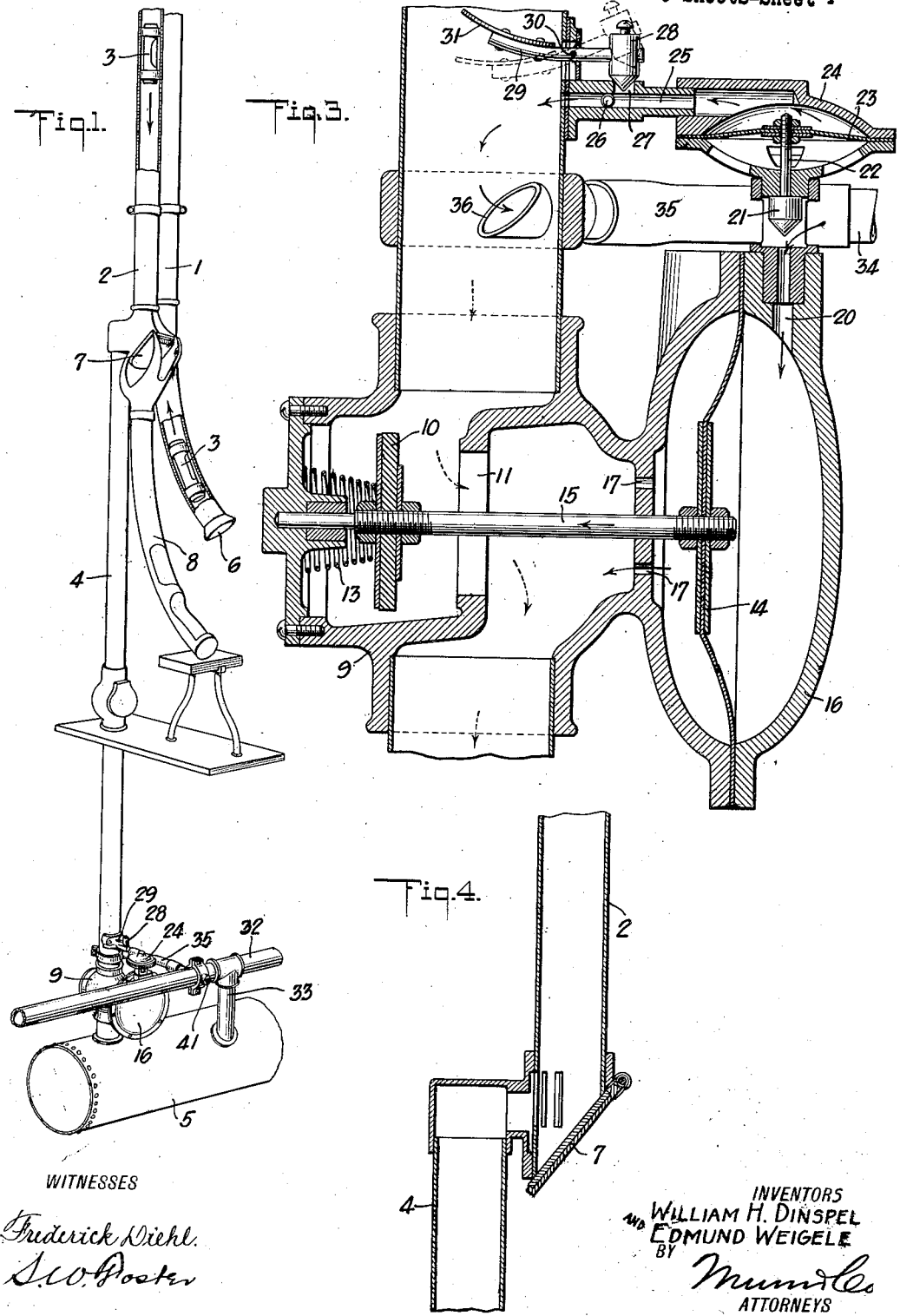

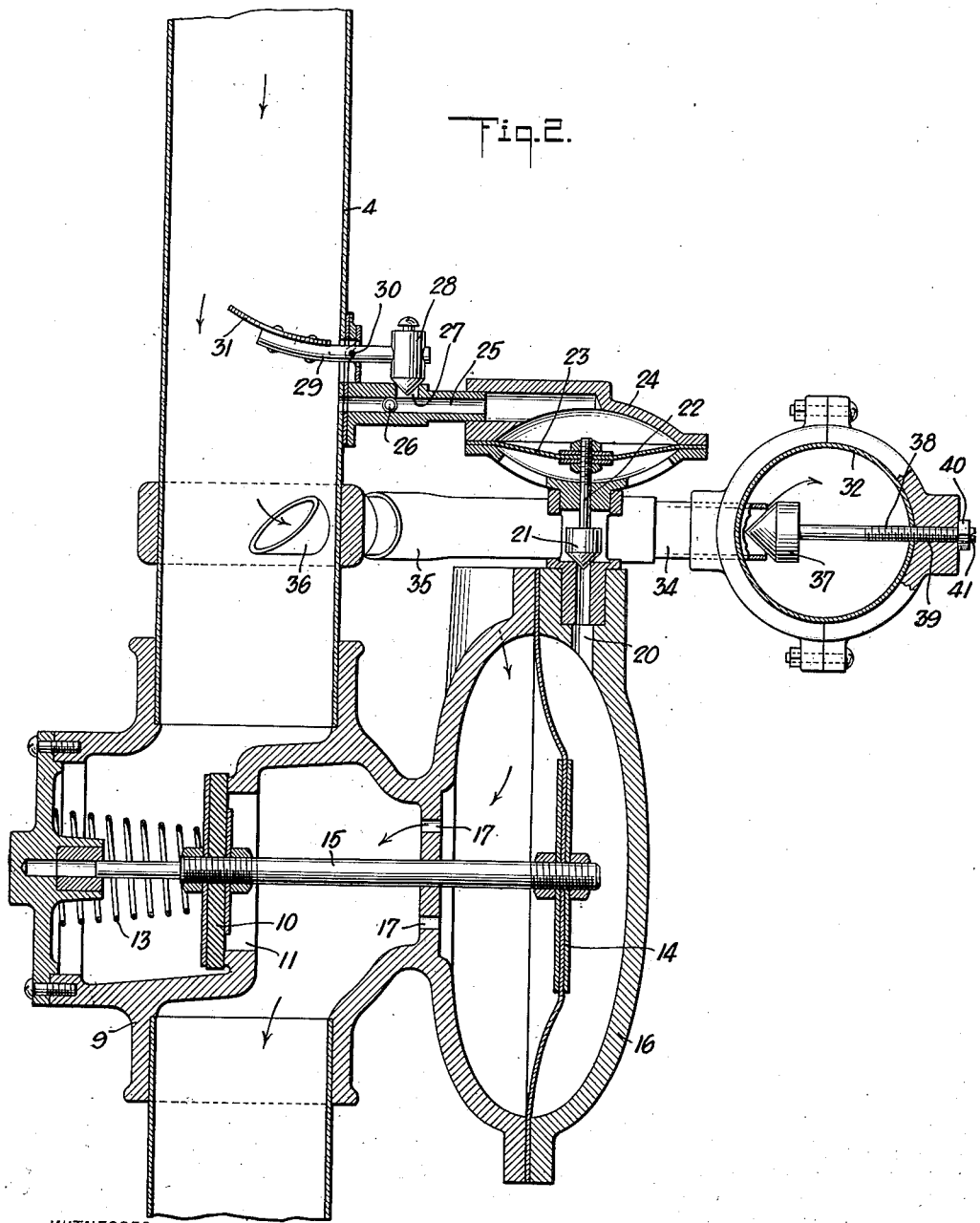

1,470,600

UNITED STATES PATENT OFFICE.

WILLIAM H. DINSPEL, OF NEW YORK, N. Y., AND EDMUND WEIGELE, OF BERGENFIELD, NEW JERSEY, ASSIGNORS TO ATLAS DEVICES COMPANY, INCORPORATED, OF NEW YORK, N. Y., A CORPORATION OF NEW YORK.

PNEUMATIC DISPATCH APPARATUS.

Application filed August 12, 1920. Serial No. 403,017.

*To all whom it may concern:*

Be it known that we, WILLIAM H. DINSPEL and EDMUND WEIGELE, citizens of the United States, and residents, respectively, of the city of New York, borough of Manhattan, in the county of New York and State of New York, and Bergenfield, in the county of Bergen and State of New Jersey, have invented a new and Improved Pneumatic Dispatch Apparatus, of which the following is a full, clear, and exact description.

This invention relates to pneumatic dispatch tube systems, and particularly to a device for use in association with the tube lines of such systems for controlling and regulating the pressure or force propelling carriers through lines of the system.

The invention has for its object the provision of a device which operates, preferably automatically, to minimize the consumption of power incident to maintaining operating conditions in the tube lines of the system when no carriers are in the line, and, primarily to reduce the power necessary to effect the delivery of carriers by the regulation of air admission or flow, and thus, the carrier-propelling pressure or force, to the conditions of travel and speed of the carrier in its flight through the line, with consequent saving of power while the carrier is in transit.

The device constituting the invention has been applied to great advantage in pneumatic dispatch systems of the so-called vacuum type, in which the tube lines are connected to a source of power for evacuating air therefrom as a means of creating a difference in pressure between the air columns separated by the carrier in its flight through a line, which thus furnishes the pressure or force for propelling the carrier through the line. The features of construction of the device and its principles of operation are, however, applicable with equal advantage to the so-called pressure systems in which carriers are propelled through the tube lines by means of a blast of air under pressure.

While the invention, therefore, involves the provision of a power control and regulating device which is adapted to any type of pneumatic dispatch system, whether of the vacuum or pressure type, the device will be explained in connection with vacuum systems which are so generally in use, and especially in connection with vacuum systems of the open type—that is, systems in which the tube lines are open at one end, each having a so-called bell mouth entrance, and connected at the opposite end through a return tube line to suction means, such as a suction drum; the tube lines having control means, commonly a valve, operating normally to maintain a partial or restricted flow of air when the lines are unoccupied by carriers, and which is automatically opened by the cutting off or obstruction of the flow of air through an open end or bell mouth of a line, as when a carrier is inserted, to establish a maximum flow or force to propel the carrier through the line.

In open vacuum systems of this type operating on the principle of normally maintaining a partial or restricted flow of air, sometimes referred to as a minimum flow, with no carriers in the lines, and a full or unrestricted flow with carriers in the lines, the transit lines of the system are connected to the vacuum drum by means of suction tubes in which the valves for controlling the flow of air through the lines are situated. With no carriers in the lines, the valves are closed and the transit lines are in communication with the suction drum through a shunt pipe line or by-pass around the valve through which the partial or restricted flow of air is maintained with no carriers in transit. This partial flow of air is induced by maintaining a reduced pressure in the tube lines below atmospheric pressure ranging from one-half to two or three inches water gauge. The control valves are constructed and arranged so that when a carrier is inserted in a line, the valve in that line opens to establish direct communication between the suction drum and the transit tube, thus putting the full suction of the drum on the line and inducing a full or unrestricted flow of air through the inlet end or bell mouth thereof. This full suction, creating a maximum flow through the line, amounts in the ordinary operation to a vacuum of about 27 inches water gauge, and the force or pressure then available for propelling a carrier is substantially equal to the difference between this vacuum, or more strictly speaking, partial vacuum or reduced pressure on one side of the carrier, and atmospheric pressure on the other side thereof.

In tube systems of this general type heretofore developed, this full propelling force or pressure acts substantially undiminished throughout the travel of the carrier to propel the carrier through the line, irrespective of the grade of a line at different points, or its length. The full propelling pressure or force so developed is usually desirable where a carrier is to be moved along an ascending grade of tube or even along a horizontal stretch, especially where the latter is of considerable length, but obviously the full propelling force or suction is neither necessary nor desirable where a carrier travels along a descending grade of tube, in which case it is moved along by the action of gravity as well, or for propulsion of the carrier along a short line irrespective of its grade. In the latter case, application of the full propelling force during a part only of the travel of the carrier through the short line usually suffices to propel it therethrough, even where the line rises abruptly, or for that matter, vertically. Both in short lines, and in long lines in which descending grades and vertical drops are usually quite numerous, the tendency is for the carrier speed to become greatly excessive under constant action of the carrier-propelling force, and the excessive speed of the carrier under such conditions results in damage to the carrier, hard wear and frequently injury to the buffer heads, and damage to discharge flaps or doors and to the tube lines themselves, as when the carrier rounds a bend in the line after a drop to again travel horizontally, or along an ascending grade, or to be discharged.

The present invention therefore provides a device for regulating the pressure or force propelling a carrier through a tube line in accordance with the requirements of the conditions of travel and speed of the carrier, increasing the air flow through the inlet end of the line, or in other words, the propelling pressure or force, when the carrier is on an ascending grade, and decreasing or restricting the air flow or propelling force through short lines or when the carrier is on a descending grade, for instance, in a long line, such regulation being continued throughout the travel of the carrier in the line and until it is delivered. By regulation of air flow in this manner, it will be seen, that a substantial saving in power is realized, as well as the prevention of excessive speed of travel of the carrier with the resultant injury to carriers and tube lines.

The device for accomplishing such regulation and control of air flow and power consumption consists, in its essential elements, of means for regulating the flow of air in the tube lines, or in other words, the pressure or force propelling carriers through the line, after insertion of a carrier in the line and during its flight therethrough, in accordance with the grade or length of the tube line which influences the speed of travel of the carrier. For example, such power control and regulating means are constructed and arranged to increase the flow of air through the line, that is, from the inlet end, thus increasing the propelling force, when the carrier is on an ascending grade, to restrict the flow of air and reduce the pressure or propelling force to a minimum when the carrier is on a descending grade, reduce the propelling force along short lines, etc. whether the system is one operating upon the pressure or vacuum principle.

Where the system is one in which the air in the tube lines is evacuated to produce the propelling force for the carrier, the power control and regulating means provided by the invention operate to increase the suction in the line when the carrier is on an ascending grade, and to decrease the suction when the carrier is on a descending grade, or in other words, when the speed of the carrier becomes excessive. The device employed for effecting these results consists, in one form, of means which is responsive to the pressure, primarily the static pressure, in the line for restricting the flow of air therethrough, and a device which is responsive primarily to the movement of air through the line for actuating the pressure responsive means.

In the preferred construction, the control and regulating device is in the form of a globe valve casing, conveniently situated in the suction tube of the system, which latter connects the transit tube to the suction drum, and has a master valve for regulating the flow of air through the suction tube, or in other words, through the tube line. Means are provided, such, for example, as a main diaphragm operatively connected to the valve for controlling the operation of the latter, and there is provided a device, conveniently termed a regulating device, for regulating the operation of the valve-actuating means, and which is constructed and arranged to be actuated, when the speed of the carrier in the line becomes excessive, to cut down the flow of air to a partial or fractional flow which is normally maintained through an appropriate by-pass connection, with, for example, a pilot line communicating with the suction drum. Preferably, the master valve actuating means, or diaphragm, is actuated by an auxiliary actuating means, or auxiliary diaphragm, associated with the main diaphragm and in communication with the suction tube, for controlling the operation of the main diaphragm by admitting and shutting off, as by means of a valve, the admission of atmospheric air to one side of the main diaphragm, the latter being preferably in communication on its other side through ports in the diaphragm casing, with the suction tube. The regulating means consists, specifically, of a device associated with the auxiliary diaphragm for admitting and shutting off the admission of atmospheric air to one side of this diaphragm. For this purpose there is provided a valve which is operated by means of a blade or vane, situated in the suction line. The blade or vane, in turn, is actuated by the kinetic energy of the air, or air flow through the line at and above a predetermined amount or rate to open and close the valve controlling the admission of air to the auxiliary diaphragm, to which valve the blade or vane is connected, as by means of a lever fulcrumed between its ends.

The details of construction and operation of the master valve, the main and auxiliary diaphragms controlling this valve, and the regulating device, will be described hereinafter in connection with the accompanying drawings illustrating one form of construction of the power control and regulating device in which further features of the invention will be brought out.

In the accompanying drawings—

Figure 1 is a perspective view illustrating our improved pneumatic dispatch apparatus in connection with a sending and receiving tube.

Figure 2 is an enlarged view in vertical longitudinal section through the suction tube and our improved controlling mechanism.

Figure 3 is a view similar to Figure 2 showing the parts in different positions.

Figure 4 is an enlarged view in section showing the juncture of the suction tube with the receiving tube or line.

Figure 5 is a top plan view of the mechanism shown in Figures 2 and 3.

Figure 6 is a fragmentary view in elevation but partly in section.

Figure 7 is a fragmentary view in section on the line 7—7 of Figure 5.

Referring particularly to Figure 1, 1 represents an ordinary sending tube and 2 a receiving tube through which any approved type of carrier, such as indicated at 3, is adapted to move. An air suction tube 4 connects the receiving tube 2 with a suction drum 5, which latter is adapted to evacuate air in the system as will be understood.

The sending tube 1 is provided with the ordinary bell mouth entrance 6 and the receiving tube 2 discharges past a normally closed gate 7 into a tubular receptacle 8 as is common in the art. It is, of course, to be understood that the sending and receiving tubes are connected at some point in the system so that by evacuating the air in the system, the carriers 3 are caused to move through the tubes in the ordinary way.

The suction tube 4 is provided with a globe valve casing 9 which is preferably, although not essentially, adjacent to the drum 5 and in this valve casing 9 a valve 10 is located and normally closes a passage 11 in the suction pipe. A spring 13 exerts pressure on the valve 10 to hold it in normal closed position and a diaphragm 14 is connected to the valve by means of a stem 15 and is adapted, when operated, to open the valve as will be hereinafter explained. This diaphragm 14 is secured within diaphragm casing 16, the latter having open communication with the globe valve casing 9 at one side of the valve 10 by means of perforations 17.

To distinguish the parts above described from those hereinafter mentioned, we shall hereinafter refer to the diaphragm 14 as the "main diaphragm" and the valve 10 as the "diaphragm valve" because it is operated and controlled by the position of the diaphragm 14.

The diaphragm casing 16 is provided with a by-pass 18 (see Fig. 7) located in the wall of casing 16 and connecting the casing at opposite sides of the diaphragm and an adjusting needle valve or other type of valve 19 is provided to cut off this by-pass to any extent desired so as to cause the flow of air from one side of the diaphragm to the other to be as slow or as fast as needed to perform the desired functions.

The diaphragm casing 16 is provided with an air inlet port 20 which communicates with the rear or outer half of the diaphragm casing and this port 20 is normally closed by a needle valve 21, the stem 22 of which is secured to a smaller or auxiliary diaphragm 23. This diaphragm 23 is located within a diaphragm casing 24 having its lower portion in open communication with the atmosphere and its upper portion connected by a pipe 25 with the suction pipe 4.

This needle valve 21 we shall hereafter refer to as the auxiliary diaphragm valve because it is operated by the smaller or auxiliary diaphragm 23 and controls the inlet of atmospheric air to the diaphragm casing 16. A screw or other type of valve 26 projects into the pipe 25 and may be adjusted so as to regulate the flow or passage of air therethrough, and an air inlet port 27 is provided in the upper portion of pipe 25 and is normally closed by a needle valve 28 which we shall hereinafter refer to as a regulator valve.

The valve 28 is secured to one end of a lever 29, the latter projecting into suction pipe 4 and pivotally supported between its ends as shown at 30. A blade or vane 31 is secured to the lever 29 and located within the suction pipe 4 for a purpose which will hereinafter appear.

A pipe 32, which we shall hereinafter refer to as a pilot line pipe, communicates by means of a branch pipe 33 with the suction drum 5 and is provided with a short tube 34 extending therethrough and constituting at its outer end a nipple which is connected by a flexible pipe or hose 35 with an outlet nozzle 36, the enlarged open and preferably inlet end of said nozzle being located within the suction pipe 4 and directed upwardly so as to facilitate the flow of air thereinto and through.

The inner end of the short tube 34 above referred to, projects into the pilot pipe 32 and constitutes a valve seat and a pilot valve 37 is located within the pilot pipe 32 and has a screw threaded stem 38 adjustably screwed through a clamp 39 on the pipe 32 and secured by means of a lock nut 40. The outer end of the stem 38 may have a screw driver receiving groove 41 therein or may be constructed so as to facilitate its adjustment in any approved manner, and it is to be understood that this valve is stationary after it is once adjusted so as to give the desired flow of air through the pilot line.

By reason of this arrangement of pilot valve it is a comparatively simple matter to regulate the flow of air through the system and correct any inefficiencies at different points in the system because this valve can be opened as far as may be desired to give the results intended.

The operation is as follows: Figure 2 illustrates the normal position of parts when there is no carrier in the line, and referring to this figure and also to Figure 1, it will be noted that the main diaphragm valve 10 is closed and a slight movement of air is permitted from the suction pipe 4 through the outlet nozzle 36 and pipe 35 past the pilot valve 37 and through the pilot line 32 to the suction drum 5. It also will be noted that the valves 21 and 28 are inclosed position.

As soon as a carrier is inserted in the sending tube 1, a suction or partial vacuum will be created in the upper portion of the auxiliary diaphragm chamber 24 as the carrier will act as a stopper or stoppage for the inlet of air and the suction through the pilot line will have its effect upon the diaphragm 23 by reason of this suction of air from the upper half of the auxiliary diaphragm chamber 24. This suction will move the diaphragm 23 upwardly to lift the valve 21 and open the port 20 to the atmosphere. As soon as this takes place, the vacuum is destroyed in the inner half of the main diaphragm casing 16 and this will cause the main diaphragm 14 to move in a direction to open the valve 10, so that the suction will be straight through the pipe 4 to move the carrier, the position of parts just described being shown most clearly in Fig. 3.

When the carrier begins to drop or move too rapidly due to any cause, there will be created in the suction pipe 4 a rapid flow of air past the blade or vane 31 and when this flow reaches a predetermined degree, or, in other words, when the kinetic energy of the air is sufficient, it will cause the blade or vane 31 to move downwardly as indicated in dotted line position in Figure 3, and when this takes place, the regulator valve 28 will be lifted to its open position through the medium of the lever 29.

When the valve 28 is opened, the partial vacuum in the upper portion of the auxiliary diaphragm casing 24 is destroyed by the inrush of atmospheric air when the diaphragm 23 and valve 21 will move downwardly to shut off the air inlet port 20 from the main diaphragm casing 16, so that the main diaphragm 14 will operate assisted by the spring 12 to move the valve 10 either to or partially toward its closed position so as to check the flow of air through the suction pipe 4 and the line with which it is connected.

It is, of course, to be understood that this movement of the blade or vane 31 and regulator valve 28 is extremely sensitive, so that while it operates momentarily to check the rapid flow of air, and hence a too rapid movement of the carrier, it will, as soon as such checking operation takes place, immediately close, so that the parts will be restored to their former position and during the movement of the carrier this regulator valve may be opened and closed a number of times by the rapid rushing of air past the blade or vane 31.

It will thus be seen that we not only provide means for automatically controlling the operation of the main diaphragm valve in the main suction pipe, but also provide a regulating means controlled by a blade or vane which is operated upon by the movement or kinetic energy of the air, so that an economy of power is had as wastage of energy is reduced to a minimum and the excessive speed of the carrier is checked, thus preventing undue wear in the line and also injury and damage to the carrier and parts of the line. When the carrier passes out of the receiving line 2, it opens the gate 7 by means of its momentum and falls into the receiver 8, the gate 7 instantly closing so as to prevent a wastage of energy.

It will thus be noted that a pneumatic dispatch system equipped with our improvements will have a slight flow of air when the line is idle through the transmission or sending line 1, receiving line 2 and suction pipe 4, through the pilot lines 35 and 32 and suction drum 5. The operation of inserting a carrier at any point in the transmission line interrupts the flow through the line causing the vacuum value to rise in the upper half of the auxiliary diaphragm chamber 24 and, through the medium of the diaphragm 23, causing the opening of the diaphragm valve 21. This opening movement of the valve 21 destroys the vacuum on the outer side of the main diaphragm 14, so that the vacuum on the other side of the diaphragm causes a movement of the diaphragm and the valve 10 to open the latter. The valve 21 is held open during the entire period that the carrier obstructs the full passage of air through the transmission line.

When the carrier attains a rate of speed equal to or slightly in excess of the normal rate of speed of the atmosphere travelling through the transmission tube, the effect is that this free flow of air acts on the blade or vane 31 causing the partial vacuum to be destroyed in the upper half of the auxiliary diaphragm casing 24 allowing the valve 21 to close, and, as above explained, as soon as this takes place the main valve 10 either closes or partially closes to cut down the suction or partial vacuum in the suction line.

When the valves return to the positions above stated, the vacuum is again restored and is equalized at both sides of the main diaphragm 14 by means of the by-pass 18 so that the valve 10 may close by means of its spring, but this action of the diaphragm and spring can only take place when the port 20 is closed by the valve 21 after the regulator valve 28 moves to closed position. The excessive speed of the carrier results primarily from the latter making a direct downward vertical movement or fall which has the effect of causing the air to weigh down or force down the vane 31 opening the regulator valve and causing a checking of the flow as explained.

It will also be noted that we provide a set of movable operating valves which require no adjustment and which cannot get out of order because of movement, such as happens with ordinary turning valves. The main valve 10 is constantly kept wide open during the period of time the transmission energy is required, and closed when not required.

Various slight changes might be made in the general form and arrangement of parts described without departing from the invention, and hence we do not limit ourselves to the precise details set forth, but consider ourselves at liberty to make such changes and alterations as fairly fall within the spirit and scope of the appended claims.

We claim:

1. In a pneumatic dispatch system, a device which is actuated by the kinetic energy of air flowing through the line to regulate the air flow.

2. In a pneumatic dispatch system, a tube line, means for controlling the flow of air through the tube line, and a device which is actuated by the kinetic energy of air flowing through the line to regulate said air flow controlling means, substantially as described.

3. In a pneumatic dispatch system, a tube line, means associated with the tube line for controlling the flow of air therethrough, mechanism for actuating said controlling means, and a regulating device responsive to the flow of air through the line, at and above a predetermined rate, for actuating said control means through said actuating mechanism, substantially as described.

4. In a pneumatic dispatch system, a transit line including a suction tube, a valve situated in the suction tube for controlling the flow of air through the line, means which is constructed and arranged to be actuated by an increase in the amount of suction in the line for opening the valve, and a device which is actuated independently of the suction in the line for causing said valve actuating means to operate to close the valve when the speed of a carrier in the line becomes excessive, substantially as described.

5. In a pneumatic dispatch apparatus, a transit line including a suction tube, a valve in the suction tube for controlling the flow of air therethrough, a diaphragm operatively connected to said valve and communicating with the suction tube at one side thereof, a connection with the other side of the diaphragm having a port for communication with the atmosphere, a valve for closing said port, an auxiliary diaphragm, in communication with the suction tube, for actuating said last mentioned valve, and a regulating device including a valve, actuated by a blade or vane in the suction tube, for admitting atmospheric air to one side of said auxiliary diaphragm, substantially as described.

6. In a pneumatic dispatch apparatus, a tube line, a valve in said line, means for normally maintaining a partial flow of air through the line, means actuated upon insertion of a carrier in the line to increase the flow of air and a device associated with said means, which is responsive to the movement of air in the line for regulating the flow thereof, substantially as described.

7. A pneumatic dispatch apparatus, including a suction line, a main valve in the suction line, a diaphragm casing, a diaphragm in the casing operatively connected to the valve, and a regulator including a blade or vane located in the suction line and operating to compel the valve to close when the movement of air through the suction line is excessive.

8. A pneumatic dispatch apparatus, including a suction line, a main valve in the suction line, regulator mechanism controlling the operation of the main valve, and a blade or vane in the suction line operated by the pressure or movement of air thereagainst to control the movement of the valve.

9. A pneumatic dispatch apparatus, including a suction line, a main valve in the suction line, mechanism for controlling the operation of the main valve, and means including a blade or vane in the suction line operated by the pressure or movement of air thereagainst to control the movement of the valve.

10. A pneumatic dispatch apparatus, including a suction line, a main valve in the suction line, regulator mechanism controlling the operation of the main valve, and a blade or vane in the suction line operated by the pressure or movement of air thereagainst to control the movement of the valve, said regulator mechanism operating to cause the valve to move toward its closed position when the movement of air in the line is excessive, and to open the valve when the movement of air is reduced.

11. A pneumatic dispatch apparatus comprising a suction tube, a valve in the suction tube, a regulator valve controlling the movement of the main valve, and means in the suction tube which is constructed and arranged to be actuated by the suction and movement of the air thereagainst to actuate the regulator valve.

12. A pneumatic dispatch apparatus, including a suction tube, a valve in the suction tube, a regulator valve controlling the movement of the main valve, and a blade or vane in the suction tube moved by the pressure or movement of air thereagainst to move the regulator valve.

13. A pneumatic dispatch apparatus, including a suction tube, a valve in the suction tube, a regulator valve controlling the movement of the main valve, a lever pivotally supported between its ends and operatively connected to the regulator valve, said lever projecting into the suction tube, and an air moved blade or vane on the inner end of said lever.

14. A pneumatic dispatch apparatus, including a suction line, a main valve in the suction line, a pilot line communicating with the suction line above the main valve, means operated by the suction line to control the position of the main valve when the line is empty, a regulator valve controlling the movement of the main valve when a carrier is in the line, and a blade or vane operatively connected to the regulator valve located in the suction line and movable by the pressure of air thereagainst.

15. In a pneumatic dispatch apparatus, comprising a plurality of suction pipe lines, valves controlling the flow of air through said pipe lines, a diaphragm operatively connected to each of said valves, a pilot line extending transversely of the suction lines and communicating with each of the lines above said valves, and pneumatically operated valves controlling the operation of the diaphragms, the last mentioned valves being caused to open by suction through the pilot line when the carrier is in the suction line.

16. The combination with a pneumatic dispatch system including a suction line, of a valve controlling the flow of air through the system, a diaphragm connected to said valve, a diaphragm casing enclosing the diaphragm and in communication through ports with said suction line on one side of the diaphragm, a valve controlling the inlet of atmospheric air to the diaphragm casing on the other side of the diaphragm to regulate the operation of the latter, an auxiliary diaphragm casing, an auxiliary diaphragm in the casing operatively connected to the last-mentioned valve, said auxiliary diaphragm casing being in communication with the suction line whereby the movement of the auxiliary diaphragm is controlled by the suction or movement of air in the suction line.

17. The combination with a pneumatic dispatch system, of a valve controlling the flow of air through the system, a diaphragm operatively connected to said valve, a diaphragm casing enclosing the diaphragm, a valve controlling the inlet of atmospheric air to the diaphragm casing to regulate the operation of the diaphragm, an auxiliary diaphragm casing, an auxiliary diaphragm in the casing operatively connected to the last-mentioned valve, said auxiliary diaphragm casing being in communication with the suction line whereby the movement of the auxiliary diaphragm is controlled by the suction or movement of air in the suction line, a regulator valve controlling the flow of atmospheric air into the auxiliary diaphragm casing, and a blade or vane operatively connected to said last-mentioned valve and located in the suction line, said blade or vane being actuated by the movement of air in the line.

18. A pneumatic dispatch apparatus, including a suction tube, a valve in the suction tube and adapted to control the passage of air through the tube, and a regulator controlling the movement of said valve, said regulator comprising a blade or vane located in the suction tube and of an area appreciably less than the cross-sectional area of the suction tube, whereby the movement of air causes the movement of the blade or vane by reason of the pressure against the blade or vane.

WILLIAM H. DINSPEL.
EDMUND WEIGELE.